United States Patent [19]

Ferguson et al.

[11] Patent Number: 5,355,120
[45] Date of Patent: Oct. 11, 1994

[54] FREQUENCY-DIVIDING-TRANSPONDER TAG

[75] Inventors: Lucian G. Ferguson, Seattle, Wash.; William D. Thomas, St. Petersburg, Fla.

[73] Assignee: Security Tag Systems, Inc., Deerfield Beach, Fla.

[21] Appl. No.: 958,876

[22] Filed: Oct. 9, 1992

[51] Int. Cl.$^5$ ............................................. G08B 13/14
[52] U.S. Cl. ................................. 340/572; 340/551
[58] Field of Search ................ 340/572, 551; 361/212

[56] References Cited

U.S. PATENT DOCUMENTS

| | | | |
|---|---|---|---|
| 4,682,154 | 7/1987 | Fearon et al. | 340/572 |
| 4,727,360 | 2/1988 | Ferguson et al. | 340/572 |
| 4,727,668 | 3/1988 | Anderson et al. | 40/625 |
| 4,829,288 | 5/1989 | Eisenbeis | 340/551 |
| 4,882,569 | 11/1989 | Dey | 340/572 |
| 4,910,499 | 3/1990 | Benge et al. | 340/572 |
| 4,935,724 | 6/1990 | Smith | 340/551 |
| 4,940,966 | 7/1990 | Pettigrew et al. | 340/551 |
| 4,956,636 | 9/1990 | Sansom et al. | 340/551 |

*Primary Examiner*—John K. Peng
*Assistant Examiner*—Thomas J. Mullen, Jr.
*Attorney, Agent, or Firm*—Edward W. Callan

[57] ABSTRACT

The tag includes an active strip of magnetic material that, when in the presence of a magnetic bias field within a predetermined magnetic field intensity range, responds to excitation by electromagnetic radiation of a first predetermined frequency by radiating electromagnetic radiation of a second predetermined frequency that is a frequency-divided quotient of the first predetermined frequency; and a pair of bias strips of magnetic material disposed in relation to the active strip in a common housing with the active strip for magnetically biasing the active strip with a magnetic bias field within the predetermined magnetic field intensity range. The bias strips are cut from an extruded magnetic material ribbon having a width less than the length of the active strip and a magnetic moment parallel to the lateral dimension of the ribbon. The bias strips are cut at an oblique angle to the lateral dimension of the ribbon so that each bias strip has an oblique magnetic moment having longitudinal and lateral components. The bias strips are disposed in the housing such that their respective longitudinal components have the same orientation and their respective lateral components oppose each other. The active strip is disposed in a cavity for vibration. The cavity walls are coated with a permanent anti-static material to prevent the active strip from being attracted thereto. In one embodiment, a first set of an active strip and a pair of bias strips is disposed perpendicular to a second set of an active strip and a pair of bias strips.

9 Claims, 2 Drawing Sheets

FREQUENCY-DIVIDING-TRANSPONDER TAG

BACKGROUND OF THE INVENTION

The present invention generally pertains to presence-detection-system tags that include transponders and is particularly directed to improvements in tags that include frequency-dividing transponders of the type that includes an active strip of magnetic material that frequency divides when in the presence of a magnetic bias field of a predetermined intensity.

This type of frequency-dividing transponder is described in U.S. Pat. No. 4,727,360 to Lucian G. Ferguson and Lincoln H. Charlot, Jr., which is assigned to the assignee of the present application. The transponder described therein is contained in a presence-detection-system tag with a bias strip of magnetic material that, when magnetized, biases the active strip of magnetic material to be within the predetermined magnetic field intensity range so as to enable frequency division by the transponder. The frequency-dividing transponder is deactivated by demagnetizing the bias strip of magnetic material. In a typical prior art tag of this type, the bias strip of magnetic material is a strip of 1095 carbon steel of specific dimensions that has been magnetized along its length to create opposing magnetic poles at each end, and having a coercivity ($H_C$) in a range of from 20 to 40 Oersteds. This coercivity range is low enough to allow for deactivation of the transponder by applying a transverse stroke to the bias strip with a compact high strength magnet to thereby alter the magnet pole arrangement of the bias strip.

Use of a high-coercivity magnetic material in the bias strips would make the tag more resistant to deactivation.

An extruded high-coercivity magnetic material is less expensive than ceramic and metal alloy magnets, such as the Alnico series, which often require grinding and machining, and is also less expensive than other alternatives, such as injection molded, pressed or plastiformed magnets.

Extruded high-coercivity material is produced in long ribbons having a maximum width of approximately fifty millimeters and a magnetic moment parallel to the lateral dimension of the ribbon. However, in order to meet preferred design parameters, the active strip of magnetic material in the transponder tag may be of a given length that is greater than fifty millimeters, whereby if the length of the bias strip of magnetic material is no more than 50 millimeters in length, the bias field is distorted at the ends of the active strip and the transponder does not perform satisfactory.

SUMMARY OF THE INVENTION

The present invention further provides a transponder tag including an active strip of magnetic material and having a given length that, when in the presence of a magnetic bias field within a predetermined magnetic field intensity range responds to excitation by electromagnetic radiation of a first predetermined frequency by radiating electromagnetic radiation of a second predetermined frequency that is a frequency-divided quotient of the first predetermined frequency; and a pair of bias strips of magnetic material disposed on opposite sides of the active strip in a common housing with the active strip for magnetically biasing the active strip with a magnetic bias field within the predetermined magnetic field intensity range, wherein the bias strips are cut from an extruded magnetic material ribbon having a width less than the given length of the active strip and a magnetic moment parallel to the lateral dimension of the ribbon, with the bias strips being cut at an oblique angle to the lateral dimension of the ribbon so that each bias strip has an oblique magnetic moment having longitudinal and lateral components; wherein the bias strips are disposed in the housing such that their respective longitudinal components have the same orientation their respective lateral components oppose each other.

In another aspect, the present invention provides a transponder tag, including a first active strip of magnetic material that, when in the presence of a magnetic bias field within a predetermined magnetic field intensity range, responds to excitation by electromagnetic radiation of a first predetermined frequency by radiating electromagnetic radiation of a second predetermined frequency that is a frequency-divided quotient of the first predetermined frequency; a first bias strip of magnetic material disposed in relation to the first active strip in a common housing with the first active strip for magnetically biasing the first active strip with a magnetic bias field within the predetermined magnetic field intensity range; a second active strip of magnetic material that, when in the presence of a magnetic bias field within the predetermined magnetic field intensity range, responds to excitation by electromagnetic radiation of the first predetermined frequency by radiating electromagnetic radiation of the second predetermined frequency; and a second bias strip of magnetic material disposed in relation to the second active strip in the common housing for magnetically biasing the second active strip with a magnetic bias field within the predetermined magnetic field intensity range; wherein the first active strip and the first bias strip are disposed in the same housing as the second active strip and the second bias strip, with the first active strip being perpendicular to the second active strip. The first and second sets of active strip and bias strip respectively define a pair of transponders that provide the same frequency-division response to excitation by electromagnetic radiation of the same predetermined frequency and that complement each other such that when one transponder is at a null orientation, the other transponder is at an optimum orientation.

In a further aspect, the present invention provides a transponder tag, including an active strip of magnetic material that, when in the presence of a magnetic bias field within a predetermined magnetic field intensity range, responds to excitation by electromagnetic radiation of a first predetermined frequency by radiating electromagnetic radiation of a second predetermined frequency that is a frequency-divided quotient of the first predetermined frequency; and a bias strip of magnetic material disposed in relation to the active strip in a common housing with the active strip for magnetically biasing the active strip with a magnetic bias field within the predetermined magnetic field intensity range, wherein the housing includes a cavity in which the active strip is disposed for vibration, with the cavity having plastic material walls that are coated with a permanent anti-static material to prevent the active strip from being attracted to said walls.

These different aspects of the present invention may be combined in the preferred embodiments. Additional features of the present invention are described in relation to the detailed description of the preferred embodiments.

DETAILED DESCRIPTION

Figure 1:
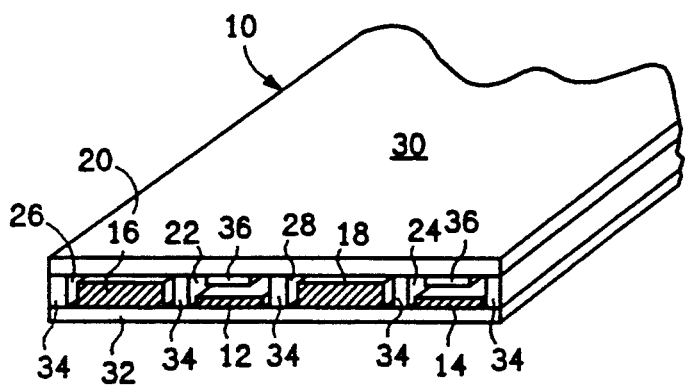
FIG. 1 illustrates a preferred embodiment of a presence-detection-system tag that includes a deactivation-resistant frequency-dividing transponder.
Figure 1A:
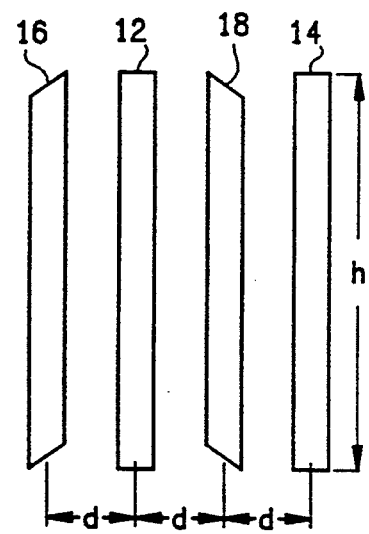
FIG. 1A shows the relative positioning of the active strips and the bias strips of the tag of FIG. 1.

Referring to FIGS. 1 and 1A a preferred embodiment of a presence-detection-system tag 10 according to the present invention includes a first active strip of magnetic material 12, a second active strip of magnetic material 14, a first bias strip of magnetic material 16 and a second bias strip of magnetic material 18. Both bias strips 16, 18 are positioned in the same plane as the two active strips 12, 14, with all four strips 12, 14, 16, 18 being oriented in the same direction.

The tag 10 includes a housing 20 defining cavities 22 and 24 for containing the first and second active strips 12, 14 and cavities 26 and 28 for containing the first and second bias strips 16, 18.

The housing 20 includes a hard plastic cover 30, a plastic base 32, plastic spacers 34 and plastic ridges 36 that define the walls of the cavities 22, 24, 26, 28. The active strips 12, 14 must be able to vibrate freely inside the housing cavities 22, 24 without interference of restriction, and must have no mechanical stress impressed on them from the walls of their respective cavities 22, 24. The ridges 36 help prevent the active strips 12, 14 from binding to the walls of their respective cavities 22, 24. Also the walls of the cavities 22, 24 are coated with a permanent anti-static material to prevent the active strips 12, 14 from being attracted to said walls.

The dimensions of the cavities 22, 24 need only be slightly larger than the dimensions of the respective active strips 12, 14. The bias strips 16, 18 do not need to move freely and can be attached directly to the housing 20 with adhesives or sandwiched between the cover 30 and the base 32 of the housing 20.

Each of the first active strip of magnetic material 12 and the second strip of magnetic material 14 is a thin, flat ribbon of low coercivity magnetostrictive amorphous magnetic material having a transverse uniaxial magnetic anisotropy defining the same given magnetomechanical resonant frequency "f" in accordance with the dimensions of the ribbon; wherein when the ribbon is in the presence of a magnetic bias field within a predetermined magnetic field intensity range, the ribbon responds to excitation by electromagnetic radiation of a frequency "2f" by radiating electromagnetic radiation of the given frequency f, which is a frequency divided quotient of the frequency 2f.

Suitable low coercivity magnetostrictive amorphous magnetic materials and the treatment and dimensioning thereof for making them useful as the active strips 12, 14 are described in the aforementioned U.S. Pat. No. 4,727,360.

The dimensions of the active strips 12, 14 are 65 millimeters long by 2.5 mm wide by 28 micrometers thick. The length dimension "h" is shown in FIG. 1A.

The first and second bias strips of magnetic material 16, 18 are disposed on opposite sides of the first active strip 12 for magnetically biasing the first active strip 12 with a magnetic bias field within the predetermined magnetic field intensity range.

The magnetic material of the bias strips 16, 18 has a high coercivity of at least approximately 1530 oersteds and a high retentivity of at least approximately 1970 gauss. The magnetic material of the bias strips 16, 18 is selected from a group consisting of barium ferrite and neodymium iron boron; and the bias strips 16, 18 are formed from an extruded magnetic material ribbon including particles of said magnetic material embedded in a polymer base.

Figure 2:
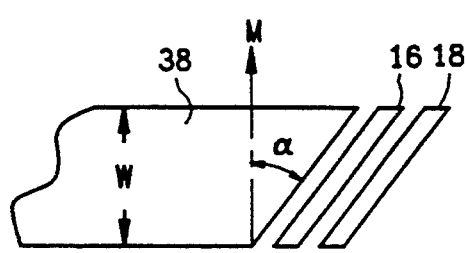
FIG. 2 illustrates the formation of the bias strips from a ribbon of extruded magnetic material.

Referring to FIG. 2, the bias strips 16, 18 are cut from an extruded magnetic material ribbon 38 that is magnetized to have a magnetic moment "M" parallel to the lateral dimension of the ribbon 38. The magnetized extruded magnetic material ribbon 38 has a width "w" of approximately 51 turn, which is less than the 65 mm length h of the active strips 12, 14. In order to provide bias strips 16, 18 having a point-to-point length h of approximately 65 mm, the bias strips 16, 18 are cut at an oblique angle "$\alpha$" to the lateral dimension of the ribbon 38, whereby each bias strip 16, 18 has an oblique magnetic moment "M" having longitudinal and lateral components "$M_{LN}$", "$M_{LT}$", as shown in FIG. 3.

Figure 4:
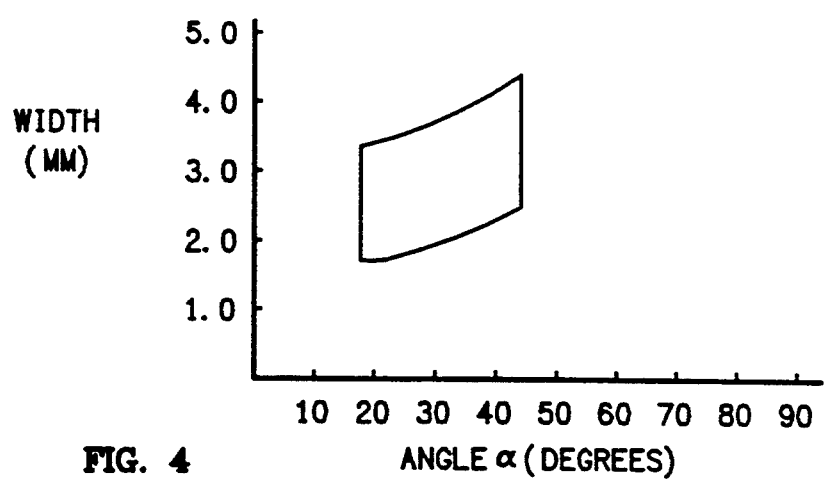
FIG. 4 is a graph of the optimum combinations of the orientation of the magnetic moment in the bias strips and the width of the bias strips.

The optimum combinations of the oblique angle $\alpha$ and the width of each bias strip 16, 18 are shown in the graph of FIG. 4. Interpreting FIG. 4, each bias strip 16, 18 has a width within a range bounded by approximately 1.8 mm and 3.3 mm when the oblique angle a is approximately 18 degrees and approximately 2.5 mm and 4.3 mm when the oblique angle a is approximately 42 degrees.

Figure 3:
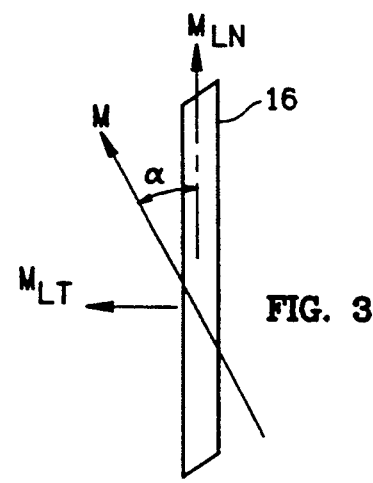
FIG. 3 illustrates the orientation of the magnetic moment in the bias strips of magnetic material.

Referring to FIGS. 1A and 3, the bias strips 16, 18 are disposed in the housing 20 on opposite sides of the first active strip 12 such that their respective longitudinal components aid each other and their respective lateral components oppose each other.

The center-to-center spacing "d" for the strips 12, 14, 16 and 18, as shown in FIG. 1A, is approximately 8.5 mm.

The second active strip 14 is disposed adjacent only the second bias strip 18 on the opposite side of the bias strip 18 from the first active strip 14, and thereby is not biased to be within precisely the same magnetic field intensity range as the first active strip 12, although the respective magnetic field intensity ranges in which the first and second active strips 12, 14 are biased may overlap and both fall within at least a portion of the predetermined magnetic field intensity range in which frequency division is enabled. Since the second active strip 14 is adjacent only the second bias strip 18, it is biased by a magnetic field having less intensity than the magnetic field that biases the first active strip 12; whereby when the ambient magnetic field is of such strength as to combine with the magnetic field provided by the first and second bias strips 16, 18 as to bias the first active strip 12 with a magnetic bias field that is above the predetermined magnetic field intensity range, the magnetic field applied to the second active strip 14 may still be within the predetermined magnetic field intensity range in which frequency division is enabled. This feature further inhibits deactivation of the transponder tag 10 when in the presence of a strong ambient magnetic field.

Figure 5:
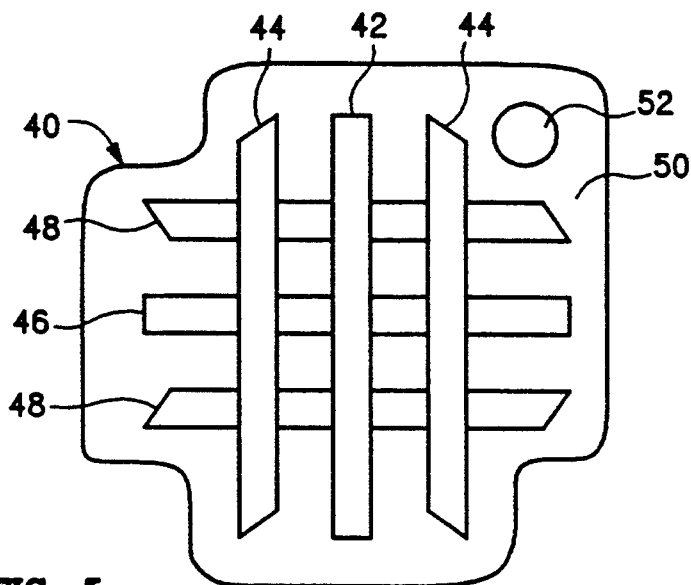
FIG. 5 illustrates the relative positioning of the active strips and the bias strips in an alternative preferred embodiment of a presence-detection-system tag that includes a pair of deactivation-resistant frequency-dividing transponders.

Referring to FIG. 5, an alternative preferred embodiment of a presence-detection-system transponder tag 40 according to the present invention includes a first set of an active strip of magnetic material 42 and a pair of bias strips of magnetic material 44 and a second set of an active strip of magnetic material 46 and a pair of bias strips of magnetic material 48 disposed in a common housing 50. The active strip 42 and the pair of bias strips 44 of the first set are all positioned in the same plane and are oriented in the same direction. The active strip 46 and the pair of bias strips 48 of the second set are all positioned in the same plane and are oriented in the same direction, which is perpendicular to the direction of orientation of the strips 42, 44 of the first set. Detrimental interactions due to magnetic coupling between the strips 42, 44 of the first set and the strips 46, 48 of the second set is minimized by the perpendicular orientation of one set to the other. The housing 50 defines cavities (not shown) that separate the strips 42, 44, 46, 48. The cavities are defined in the same manner as in the embodiment of FIG. 1. The housing 50 further includes a clutch mechanism 52 that enables the tag 40 to be attached to an article to be detected by inserting a pin through the article and into the clutch mechanism.

The active strips 42, 46 and the bias strips 44, 48 are respectively of the same material, dimensions and construction as the active strips 12, 14 and the bias strips 16, 18 in the embodiment of FIG. 1.

The two bias strips 44 of the first set are disposed in the housing 50 on opposite sides of the active strip 42 of the first set such that their respective longitudinal components aid each other and their respective lateral components oppose each other.

The two bias strips 48 of the second set are disposed in the housing 50 on opposite sides of the active strip 46 of the second set such that their respective longitudinal components aid each other and their respective lateral components oppose each other.

Each of the active strip 42 of the first set and the active strip 46 of the second set is a thin, flat ribbon of low coercivity magnetostrictive amorphous magnetic material having a transverse uniaxial magnetic anisotropy defining the same given magnetomechanical resonant frequency "f" in accordance with the dimensions of the ribbon; wherein when the ribbon is in the presence of a magnetic bias field within a predetermined magnetic field intensity range, the ribbon responds to excitation by electromagnetic radiation of a frequency "2f" by radiating electromagnetic radiation of the given frequency f, which is a frequency divided quotient of the frequency 2f.

Accordingly, the first set of the active strip 42 and the pair of the bias strips 44 and the second set of the active strip 46 and the pair of bias strips 48 respectively define a pair of transponders that provide the same frequency-division response to excitation by electromagnetic radiation of the same predetermined frequency and that complement each other such that when one transponder is at a null orientation, the other transponder is at an optimum orientation.

Figure 6:
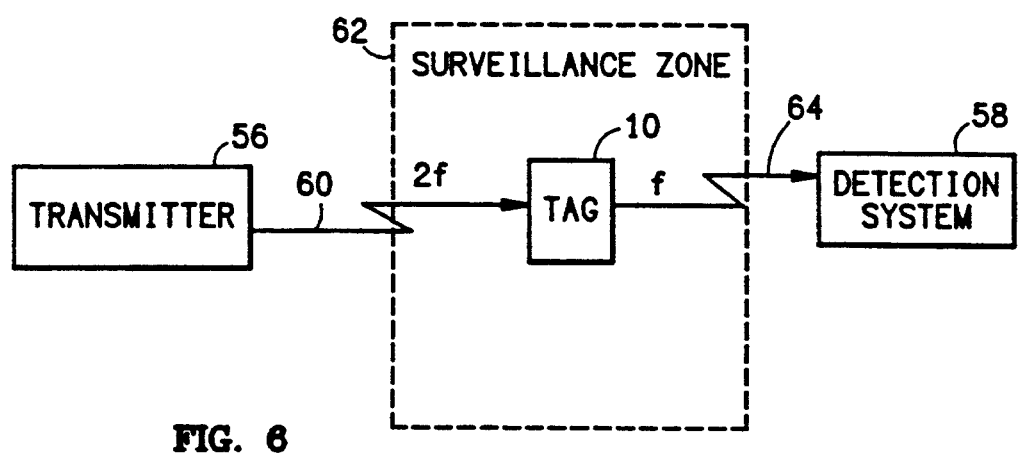
FIG. 6 is a diagram of a presence detection system including a deactivatable frequency-dividing-transponder tag according to the present invention.

Either of the tags, 10, 40 may be used in a presence detection system as shown in FIG. 6. An embodiment of such system, including the tag 10, further includes a transmitter 56 and a detection system 58. The transmitter 56 provides a transmitted signal 60 into a surveillance zone 62. The transmitted signal 60 is provided at a frequency 2f that is twice the characteristic magnetomechanical resonant frequency f of each of the active strips 12, 14; and the detection system 58 detects electromagnetic signals 64 at the characteristic resonant frequencies f of the first and second active strips 12, 14 to thereby detect the presence of the tag 10 in the surveillance zone 62.

We claim:

1. A transponder tag, comprising
an active strip of magnetic material and having a given length that, when in the presence of a magnetic bias field within a predetermined magnetic field intensity range, responds to excitation by electromagnetic radiation of a first predetermined frequency by radiating electromagnetic radiation of a second predetermined frequency that is a frequency-divided quotient of the first predetermined frequency; and
a pair of bias strips of magnetic material disposed on opposite sides of the active strip in a common housing with the active strip for magnetically biasing the active strip with a magnetic bias field within the predetermined magnetic field intensity range, wherein the bias strips are cut from an extruded magnetic material ribbon having a width less than the given length of the active strip and a magnetic moment parallel to the lateral dimension of the ribbon, with the bias strips being cut at an oblique angle to the lateral dimension of the ribbon so that each bias strip has an oblique magnetic moment having longitudinal and lateral components; wherein the bias strips are disposed in the housing such that their respective longitudinal components have the same orientation and their respective lateral components oppose each other.

2. A transponder tag according to claim 1, wherein the bias strip has a width within a range bounded by approximately 0.07 inches (1.8 millimeters) and 0.13 inches (3.3 millimeters) when the oblique angle is approximately 18 degrees and bounded by approximately 0.10 inches (2.5 millimeters) and 0.17 inches (4.3 millimeters) when the oblique angle is approximately 44 degrees.

3. A transponder tag according to claim 1, wherein the magnetic material of the bias strips has a high coercivity of at least approximately 1530 oersteds and a high retentivity of at least approximately 1970 gauss.

4. A transponder tag according to claim 3, wherein the magnetic material of the bias strips includes particles selected from a group consisting of barium ferrite and neodymium iron boron, and wherein the particles are embedded in a polymer base.

5. A transponder tag according to claim 1, wherein the housing includes a cavity in which the active strip is disposed for vibration, with the cavity having walls that are coated with a permanent anti-static material to prevent the active strip from being attracted to said walls.

6. A transponder tag according to claim 1, further including a second active strip and a second pair of bias strips, wherein the first recited active strip and the first recited pair of bias strips are disposed in the same housing as the second bias strip and the second pair of bias strips, with the first recited active strip being perpendicular to the second active strip.

7. A transponder tag according to claim 1, further including
   a second active strip of magnetic material that, when in the presence of a magnetic bias field within said predetermined magnetic field intensity range, responds to excitation by electromagnetic radiation of said first predetermined frequency by radiating electromagnetic radiation of said second predetermined frequency that is a frequency-divided quotient of said first predetermined frequency;
   wherein the second active strip is disposed adjacent one of the bias strips on the opposite side of said one bias strip from the first active strip, whereby the second active strip is not biased to be within precisely the same magnetic field intensity range as the first active strip.

8. A transponder tag, comprising
   a first active strip of magnetic material that, when in the presence of a magnetic bias field within a predetermined magnetic field intensity range, responds to excitation by electromagnetic radiation of a first predetermined frequency by radiating electromagnetic radiation of a second predetermined frequency that is a frequency-divided quotient of the first predetermined frequency:
   a first bias strip of magnetic material disposed in relation to the first active strip in a common housing with the first active strip for magnetically biasing the first active strip with a magnetic bias field within the predetermined magnetic field intensity range;
   a second active strip of magnetic material that, when in the presence of a magnetic bias field within the predetermined magnetic field intensity range, responds to excitation by electromagnetic radiation of the first predetermined frequency by radiating electromagnetic radiation of the second predetermined frequency; and
   a second bias strip of magentic material disposed in relation to the second active strip in the common housing for magnetically biasing the second active strip with a magnetic bias field within the predetermined magnetic field intensity range;
   wherein the first active strip and the first bias strip are disposed in the same housing as the second active strip and the second bias strip, with the first active strip being perpendicular to the second active strip.

9. A transponder tag, comprising
   an active strip of magnetic material that, when in the presence of a magnetic bias field within a predetermined magnetic field intensity range, responds to excitation by electromagnetic radiation of a first predetermined frequency by radiating electromagnetic radiation of a second predetermined frequency that is a frequency-divided quotient of the first predetermined frequency; and
   a bias strip of magnetic material disposed in relation to the active strip in a common housing with the active strip for magnetically biasing the active strip with a magnetic bias field within the predetermined magnetic field intensity range;
   wherein the housing includes a cavity in which the active strip is disposed for vibration, with the cavity having plastic material walls that are coated with a permanent anti-static material to prevent the active strip from being attracted to said walls.

* * * * *